(12) United States Patent
Heink et al.

(10) Patent No.: US 7,760,392 B2
(45) Date of Patent: Jul. 20, 2010

(54) VARIATION OF SYNCHRONIZATION GAIN BASED UPON LASER POWER

(75) Inventors: Philip Jerome Heink, Lexington, KY (US); Stanley Coy Tungate, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1002 days.

(21) Appl. No.: 11/466,123

(22) Filed: Aug. 22, 2006

(65) Prior Publication Data

US 2008/0049262 A1 Feb. 28, 2008

(51) Int. Cl.
*G06F 15/00* (2006.01)
*H04N 1/36* (2006.01)

(52) U.S. Cl. ........................................ 358/1.6; 358/409

(58) Field of Classification Search ................. 358/477, 358/480, 1.3, 501, 510, 401, 409, 410, 411, 358/443, 465, 468, 471; 347/233, 234, 235, 347/236, 237, 246, 247, 248, 249, 250; 359/204, 359/216; 355/55; 327/2, 3, 291, 231, 232, 327/233, 234, 235, 236; 250/234
See application file for complete search history.

(56) References Cited

U.S. PATENT DOCUMENTS

| 5,087,813 | A | 2/1992 | Negishi | |
|---|---|---|---|---|
| 5,153,604 | A | 10/1992 | Tutiyasu | |
| 5,371,608 | A * | 12/1994 | Muto et al. | 358/412 |
| 5,576,852 | A | 11/1996 | Sawada et al. | |
| 5,933,266 | A | 8/1999 | Minakuchi | |
| 5,982,408 | A | 11/1999 | Overall et al. | |
| 6,124,948 | A | 9/2000 | Kamioka | |
| 6,344,644 | B1 | 2/2002 | Minakuchi | |
| 6,677,974 | B2 | 1/2004 | Sakakibara et al. | |
| 6,775,040 | B2 | 8/2004 | Hori | |
| 6,927,789 | B2 * | 8/2005 | Ozasa et al. | 347/249 |
| 7,209,158 | B2 * | 4/2007 | Ghang et al. | 347/235 |
| 2005/0243305 | A1 * | 11/2005 | Vig et al. | 356/71 |
| 2005/0243394 | A1 | 11/2005 | Yoo et al. | |
| 2006/0076481 | A1 * | 4/2006 | Yoo | 250/234 |

* cited by examiner

Primary Examiner—Jerome Grant, II

(57) ABSTRACT

A synchronization system for an electrographic device comprises a laser driver that drives a laser source to emit a beam having an intensity that corresponds to a laser power control signal. The beam is swept across a light detector, which generates a detection signal based upon measured intensity, and a comparing device outputs a synchronization signal based upon a comparison of the detection signal with a control signal that corresponds to the laser power control signal. Alternatively, the detection signal may be compared with a reference signal where a programmable device scales at least one of the detection signal and the reference signal based upon the laser power control signal. The synchronization signal goes active in response to the laser beam in a sufficiently consistent manner regardless of the laser beam intensity by calibrating the sensitivity of the synchronization system based upon the control signal, which corresponds to the laser power control signal.

25 Claims, 6 Drawing Sheets

VARIATION OF SYNCHRONIZATION GAIN BASED UPON LASER POWER

BACKGROUND OF THE INVENTION

The present invention relates to electrophotographic devices, and in particular, to synchronization sensors and methods of generating synchronization signals based upon laser power.

In electrophotography, an imaging system typically sweeps a laser beam across a photoconductive surface in a scan direction as the photoconductive surface advances in a process direction that is orthogonal to the scan direction. The beam is modulated as it is swept so as to write one scan line for each sweep of the beam, thus forming a latent image on the photoconductive surface in a manner that corresponds with associated image data.

During laser scanning, a synchronization signal is generated by sweeping the laser beam across a synchronization sensor before the start of each scan line. This synchronization signal is used to align each scan line on the photoconductive surface and to compensate for scanning and optical variations from one scan line to the next.

Conventional synchronization sensors have fixed resistors that set the sensor gain based upon the expected laser power range and device operating points at which the laser is to be operated. However, variations in laser power, as may be desired to accomplish a predetermined electrophotographic effect, may cause the precise location at which the beam is sensed to shift due to the fixed power level required to trigger the synchronization sensor. As such, in a color printer with multiple scanning beams, each color plane may be shifted relative to the others and cause noticeable plane to plane mis-registration.

Some sensor systems seek to address the above problem by comparing the output of two photodiodes that are offset in the scan direction. This approach is only useful if the beams scanning across the sensor always move in the same direction relative to these sensors. This approach is also more costly than a single photodiode system. Other systems seek to address the above problem by boosting the output power of the laser beam to a uniform level during synchronization sensing. However, this may require that the imaging system set a first laser power for synchronization sensing, and a second laser power for imaging operations while sweeping the beam across an image area of the photoconductive surface.

BRIEF SUMMARY OF THE INVENTION

According to a first aspect of the present invention, a synchronization system for an electrographic device comprises a laser source, a laser driver, a light detector and a comparing device. The laser driver is coupled to the laser source and is controlled to selectively drive the laser source to emit a laser beam such that an intensity of the laser beam corresponds to a laser power control signal that is supplied to the laser driver. The light detector has a light detecting element in an optical path of the laser beam and generates a detection signal based upon the intensity of light measured thereby. The comparing device outputs a synchronization signal based upon a comparison of the detection signal with a control signal that corresponds to the laser power control signal The synchronization system is configured such that the synchronization signal goes active in response to the laser beam sweeping across the light detecting element in a sufficiently consistent manner regardless of the spot power of the laser source by calibrating the sensitivity of the synchronization system based upon the control signal, which corresponds to the laser power control signal.

According to another aspect of the present invention, a method of generating a synchronization signal in an electrographic device is provided. A laser source is operable to emit a laser beam having an intensity that corresponds to a laser power control signal. The beam is swept past a light detector having a light detecting element that generates a detection signal based upon the detected light intensity. The detection signal is compared with a control signal that corresponds to the laser power control signal, e.g., POWREF as described in greater detail herein, and a synchronization signal is output based upon the comparison.

According to yet another aspect of the present invention, a synchronization system for an electrographic device comprises a laser source, a laser driver, a light detector, a comparing device and a gain setting device. The laser driver is coupled to the laser source and is controlled to selectively drive the laser source to emit a laser beam such that an intensity of the laser beam corresponds to a laser power control signal that is supplied to the laser driver. The light detector has a light detecting element in an optical path of the laser beam and generates a detection signal based upon the intensity of light measured thereby. The comparing device outputs a synchronization signal based upon a comparison of the detection signal with a reference signal and the gain setting device scales at least one of the detection signal and the reference signal based upon a control signal that corresponds to the laser power control signal.

According to yet another aspect of the present invention, a method of generating a synchronization signal in an electrographic device is provided. A laser source is operable to emit a laser beam having an intensity that corresponds to a laser power control signal. The beam is swept past a light detector having a light detecting element that generates a detection signal based upon detected light intensity. The detection signal is compared with a reference signal and a synchronization signal is output based upon the comparison, where at least one of the detection signal and the reference signal is scaled based upon a control signal that corresponds to the laser power control signal.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

An Exemplar Electrophotographic Imaging Apparatus

Figure 1:
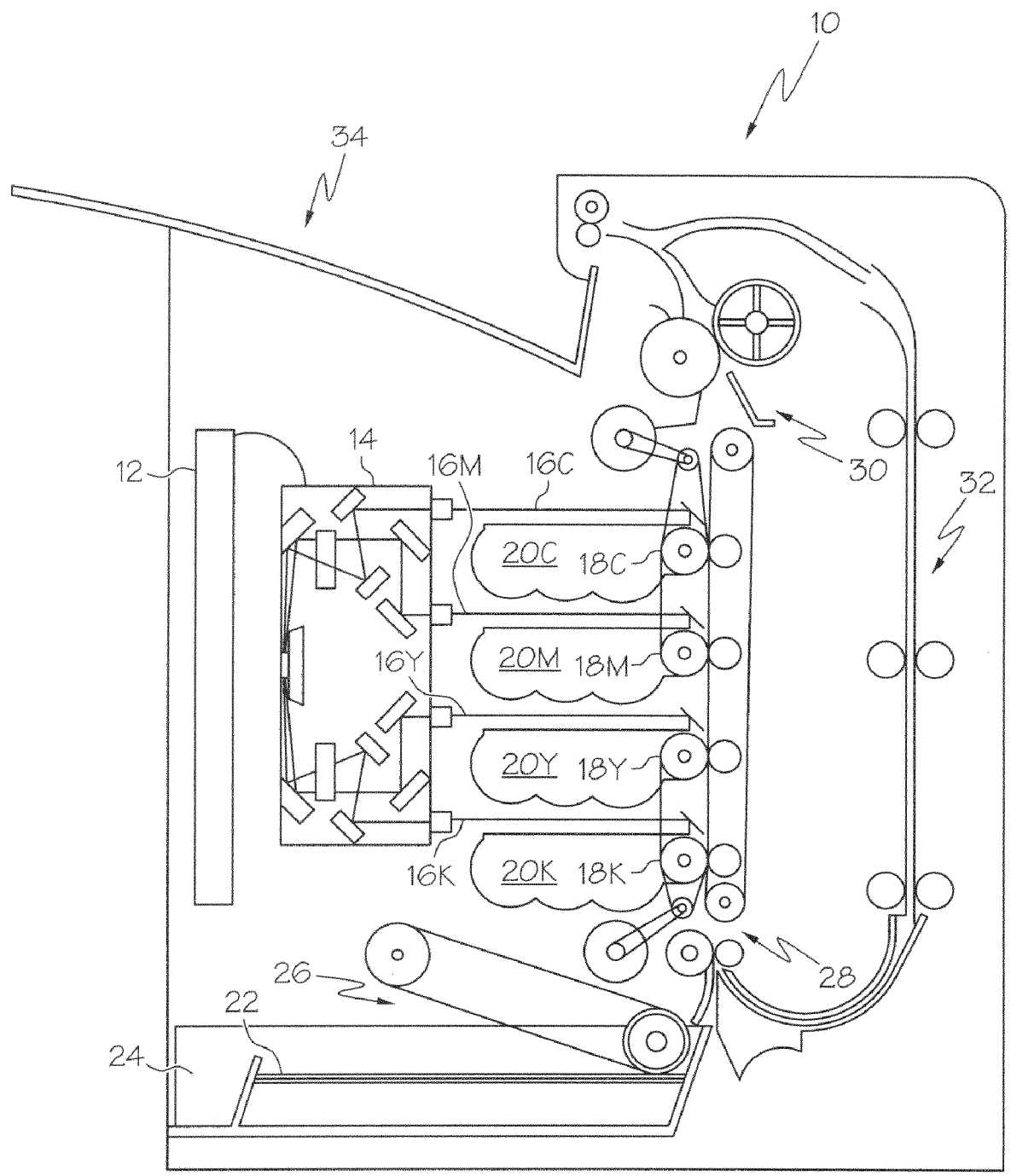
FIG. 1 is a schematic view of an exemplary electrophotographic device.

Referring now to the drawings, and particularly to FIG. 1, an apparatus, which is indicated generally by the reference numeral 10, is illustrated for purposes of discussion herein as a color or laser printer. An image to be printed is electronically transmitted to a main system controller 12 by an external device (not shown). The main system controller 12 includes system memory, one or more processors, and other software and/or hardware logic necessary to control the functions of electrophotographic imaging.

For color operation, the image to be printed is de-constructed into four bitmap images, each corresponding to an associated one of the cyan, yellow, magenta and black (CYMK) image planes, e.g., by the main system controller 12 or by the external device. The main system controller 12 then initiates an imaging operation whereby a printhead 14 outputs first, second, third and fourth modulated laser beams 16K, 16Y, 16M and 16C respectively.

The first modulated laser beam 16K forms a latent image on a photoconductive drum 18K of a first image forming station 20K based upon the bitmap image data corresponding to the black image plane. The second modulated laser beam 16Y forms a latent image on a photoconductive drum 18Y of a second image forming station 20Y based upon the bitmap image data corresponding to the yellow image plane. The third modulated laser beam 16M forms a latent image on a photoconductive drum 18M of a third image forming station 20M based upon the bitmap image data corresponding to the magenta image plane. Similarly, the fourth modulated laser beam 16C forms a latent image on a photoconductive drum 18C of a fourth image forming station 20C based upon the bitmap image data corresponding to the cyan image plane. During the imaging operation, each modulated laser beam 16K, 16Y, 16M, 16C sweeps across corresponding photoconductive drum 18K, 18Y, 18M and 18C in a scan direction that is perpendicular to the plane of FIG. 1.

The main system controller 12 also coordinates the timing of a printing operation to correspond with the imaging operation, whereby a top sheet 22 of a stack of media is picked up from a media tray 24 by a pick mechanism 26 and is delivered to a media transport belt 28. The media transport belt 28 carries the sheet 22 past each of the four image forming stations 20K, 20Y, 20M and 20C, which apply toner to the sheet 22 in patterns corresponding to the latent images written to their associated photoconductive drums 18K, 18Y, 18M and 18C. The media transport belt 28 then carries the sheet 22 with the toned mono or composite color image registered thereon to a fuser assembly 30. The fuser assembly 30 includes a nip that applies heat and pressure to adhere the toned image to the sheet 22. Upon exiting the fuser assembly 30, the sheet 22 is either fed into a duplexing path 32 for printing on a second surface thereof, or the sheet 22 is ejected from the apparatus 10 to an output tray 34.

An Exemplary Printhead

Figure 2:
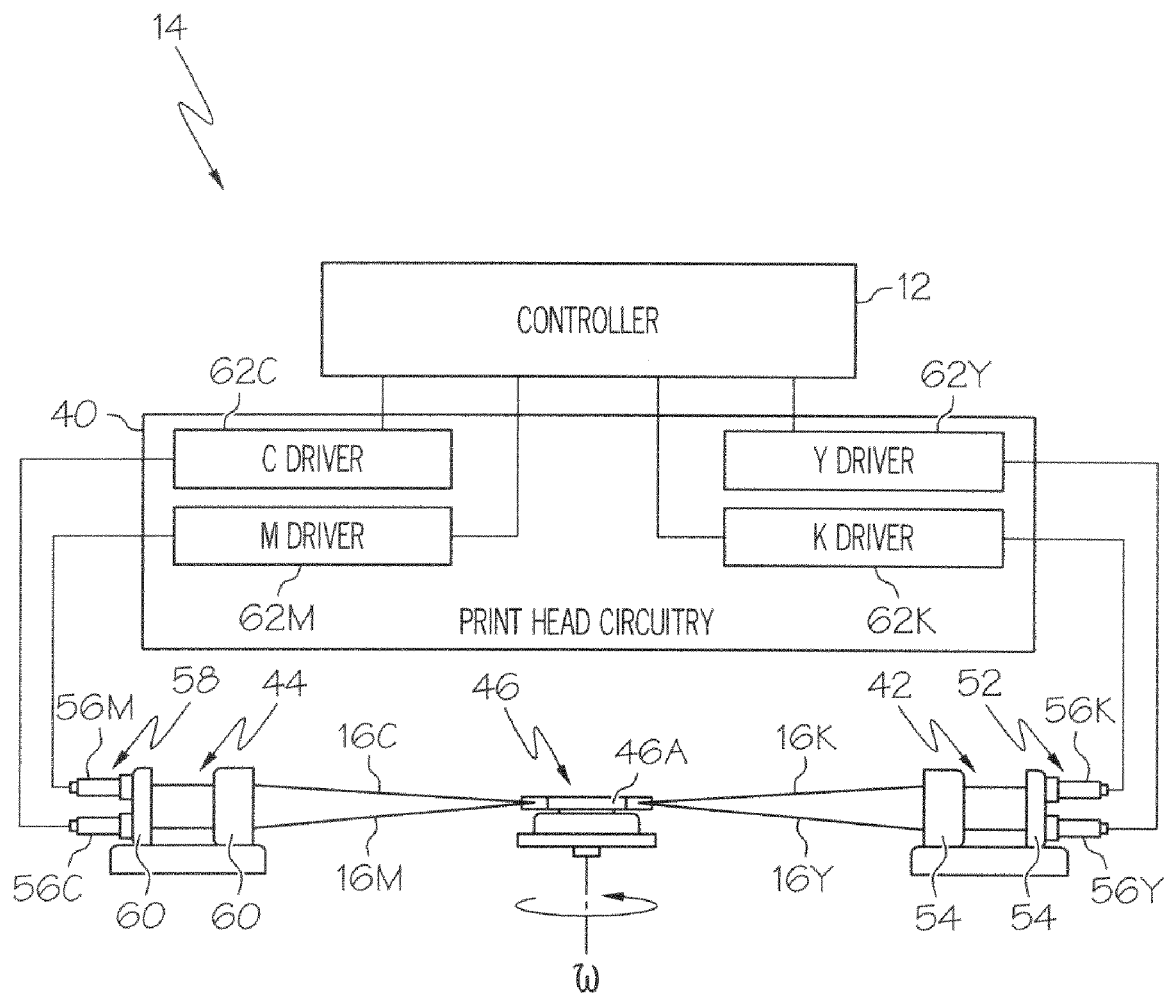
FIG. 2 is a block diagram of select components of an exemplary printhead, such as may be utilized with the device of FIG. 1, illustrating laser sources coupled to corresponding circuitry.

Referring to FIG. 2, an exemplary printhead 14 includes generally, printhead circuitry 40 that is communicably coupled to the controller 12 for exchange of image data and control data between the printhead 14 and the controller 12, first and second pre-scan assemblies 42, 44, a rotating polygon mirror 46 having a plurality of facets 46A and a post scan optical system having one or more post scan optical components (not shown in FIG. 2).

The first pre-scan assembly 42 comprises a first laser assembly 52 and a first pre-scan optical system 54. As illustrated, the first laser assembly 52 comprises a first pair of laser sources including a first laser source 56K that is associated with the black image plane and a second laser source 56Y that is associated with the yellow image plane. Similarly, the second pre-scan assembly 44 comprises a second laser assembly 58 and a second pre-scan optical system 60. The second laser assembly 58 comprises a second pair of laser sources including a third laser source 56M that is associated with the magenta image plane and a fourth laser source 56C that is associated with the cyan image plane. The first, second, third and fourth laser sources 56K, 56Y, 56M, 56C may each be implemented, for example, using a laser diode or other suitable light source.

The first and second pre-scan optical systems 54, 60 each comprise one or more collimating lenses, pre-scan lenses and/or other optical system components as the specific implementation requires to direct and focus each of the modulated beams 16K, 16Y, 16M and 16C emitted by their associated first, second, third and fourth laser sources 56K, 56Y, 56M, 56C towards the polygon mirror 46.

The printhead circuitry 40 comprises a first driver circuit 62K that is coupled to the first laser source 56K, a second driver circuit 62Y that is coupled to the second laser source 56Y, a third driver circuit 62M that is coupled to the third laser source 56M, and a fourth laser driver 62C that is coupled to the fourth laser source 56C.

During an imaging operation, the polygon mirror 46 is controlled to rotate at a fixed rotational velocity ($\omega$) and each light source 56K, 56Y, 56M and 56C is driven to emit a modulated beam 16K, 16Y, 16M and 16C corresponding to its associated one of the CYMK image data, which is communicated from the controller 12 to associated drivers 62K, 62Y, 62M, 62C on the printhead circuitry 40. The first pair of beams 16K, 16Y each strike a first one of the facets of the polygon mirror and the second pair of beams 16M, 16C each strike a second one of the facets that is different from the first one of the facets. A scan line is formed each time a new facet intercepts its pair of beams.

Post scan optics are used to direct each modulated beam 16K, 16Y, 16M, 16C to their corresponding photoconductive drum 18K, 18Y, 18M and 18C as best illustrated in FIG. 1 The post scan optical components may each be provided as part of the printhead 14 or such components may be otherwise mounted within the apparatus 10.

An Exemplary Post Scan Optical System

Figure 3:
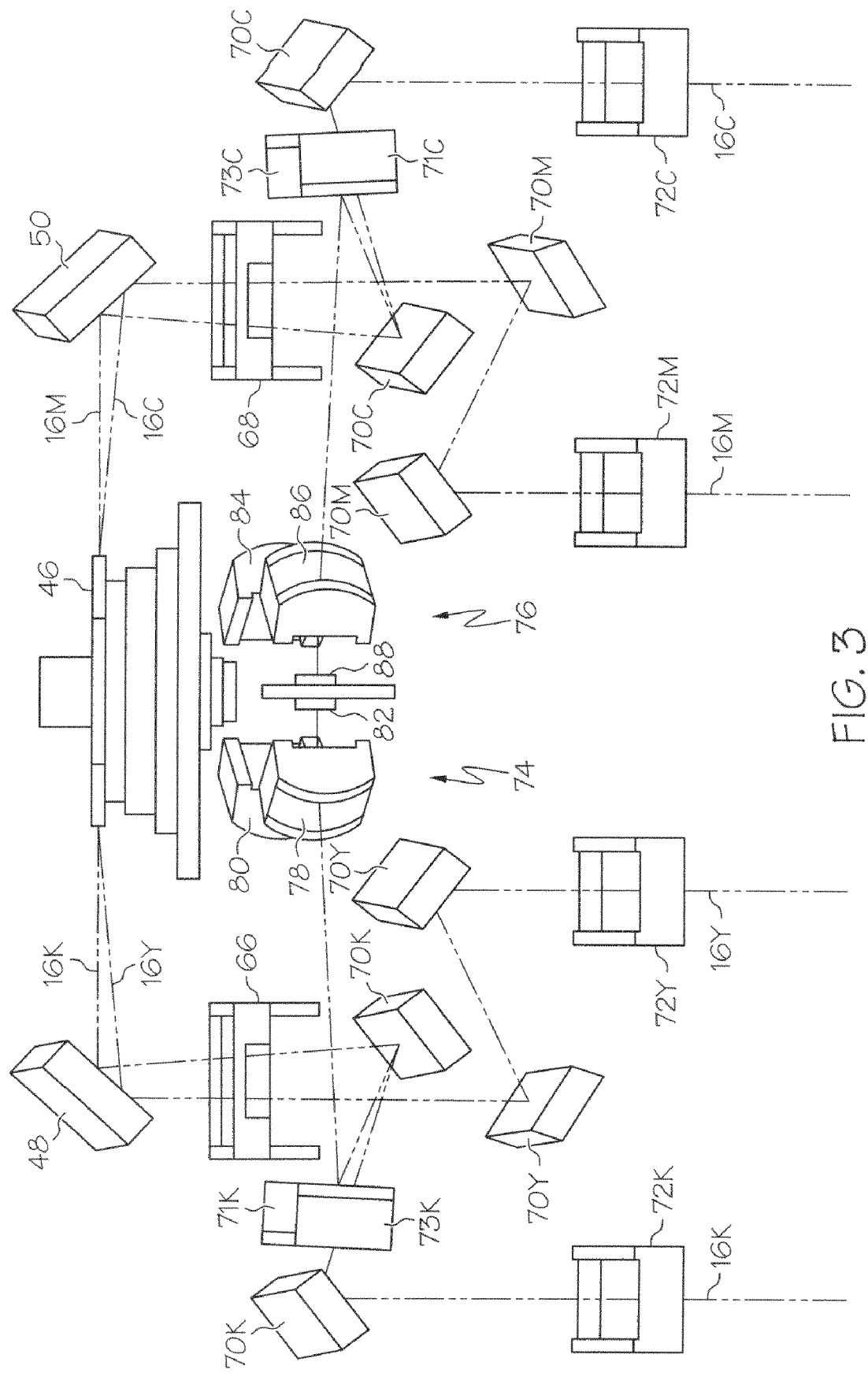
FIG. 3 is a schematic illustration of a portion of the optical path of laser sources of the printhead of FIG. 2.

With reference to FIG. 3, a portion of an exemplary post scan optical system is illustrated for the apparatus shown in FIG. 1. The beams 16K, 16Y, 16C, 16M are reflected off the polygonal mirror 46 and are folded down to the post scan optical system by the respective fold down mirrors 48, 50. The post-scan optical system 64 includes generally, first and second common lenses 66, 68, first, second, third and fourth optical pick off device pairs 70K, 70Y, 70M and 70C, and first, second, third and fourth final correction lenses 72K, 72Y, 72M and 72C. The first and second laser beams 16K, 16Y are reflected by the first fold-down mirror 48 through the first common lens 66. Similarly, the third and fourth beams 16M, 16C are reflected by the second fold-down mirror 50 through the second common lens 68. The first and second common lenses 66, 68 focus each of their associated pair of beams in the scan and process directions and may comprise, for example, an F1 lens.

The first laser beam 16K is split off after the first common lens 66 by the first optical pick off device pair 70K and is coupled through the first final correction lens 72K towards the first photoconductive drum 18K. The second laser beam 16Y is split off after the first common lens 66 by the second optical pick off device pair 70Y and is coupled through the second final correction lens 72Y towards the second photoconductive drum 18Y. Similarly, the third laser beam 16M is split off after the second common lens 68 by the third optical pick off device pair 70M and is coupled through the third final correction lens 72M towards the third photoconductive drum 18M and the fourth laser beam 16C is split off after the second common lens 68 by the fourth optical pick of device pair 70C and is coupled through the fourth final correction lens 72C towards the fourth photoconductive drum 18C. The first, second, third and fourth final correction lenses 72K, 72Y, 72M and 72C may comprise for example, an F2 lens or other lens arrangement that provides process direction focus and/or correction for facet variations.

An Exemplary Synchronization System

The post scan optical system 64 further includes a first pair start of scan pick off mirror 71 K, a first pair end of scan pick off mirror 73K, a second pair start of scan pick of mirror 71C, and a second pair end of scan pick off mirror 73C. Further, first and second synchronization systems 74, 76 are provided. The first synchronization system 74 comprises first and second collection lenses 78, 80 that are each directed towards a first sensor 82. Similarly, the second synchronization system 76 comprises third and fourth collection lenses 84, 86 that are each directed towards a second sensor 88. The first and second sensors 82, 88 are coupled to the processor 12 via the printhead electronics circuitry 40 for suitable processing as described in further detail below.

The first pair start of scan pick off mirror 71K is mounted in the housing of printhead 14 such that when the first laser beam 16K reaches a start of scan location along its scan path, e.g., at the beginning of a sweep for a given facet of rotation, the first beam 16K strikes the first pair start of scan mirror 71K, is picked off and is directed through the first collection lens 78 to the first sensor 82. As illustrated, the pick off occurs after the first laser beam 16K has passed through the first common lens 66. The timing of this event, i.e., the detection of the first beam 16K by the first sensor 82, is referred to hereinafter as Start of Scan (SOS) and designates a start of a scanning operation for each of the first and second laser beams 16K, 16Y.

Similarly, the first laser beam 16K is picked off by the mirror 73K and is directed through the second collection lens 80 to the first sensor 82 generally towards the end of a sweep for a given facet of rotation. The pick off also occurs after the first laser beam 16K has passed through the first common lens 66. The timing of this event is referred to hereinafter as End of Scan (EOS) and designates an end of a scanning operation for each of the first and second laser beams 16K, 16Y. Alternatively, the second laser beam 16Y may have been used for SOS and EOS detection.

In an analogous manner, the second pair start of scan pick off mirror 71C is mounted in the printhead housing such that when the fourth laser beam 16C reaches a start of scan location along its scan path, e.g., at the beginning of a sweep for a given facet of rotation, the fourth beam 16C strikes the second pair start of scan mirror 71C, is picked off and is directed through the third collection lens 84 to the second sensor 88. As illustrated, the pick off occurs after the fourth laser beam 16C has passed through the second common lens 68. The timing of this event, i.e., the detection of the fourth beam 16C by the second sensor 88, is also referred to hereinafter as Start of Scan (SOS) and designates a start of a scanning operation for each of the third and fourth laser beams 16M, 16C.

Similarly, the fourth laser beam 16C is picked off by the mirror 73C and is directed through the fourth collection lens 86 to the second sensor 88 generally towards the end of a sweep for a given facet of rotation. The pick off also occurs after the fourth laser beam 16C has passed through the second common lens 68. The timing of this event is referred to hereinafter as End of Scan (EOS) and designates an end of a scanning operation for each of the third and fourth laser beams 16M, 16C. Alternatively, the third laser beam 16M may have been used for SOS and EOS detection.

The selected beams used for SOS and EOS detection by the synchronization system may be rotated and/or highly astigmatic. As a result, the collection lenses 78, 80, 84, 86 may be sphero-cylindrical or implement other suitable arrangements to focus their associated beam, which may be much narrower in the scan direction than in the cross-scan direction, to a spot for striking its corresponding sensor 82, 88. Moreover, the collection lenses 78, 80, 84, 86 may be rotated individually relative to the scan plane to match the orientation of the associated laser beam.

Although FIGS. 1-3 illustrate an exemplary multi-beam printhead and corresponding apparatus, other configurations may alternatively be implemented. For example, the photoconductive drums 18K, 18Y, 18M and 18C may be replaced with a photoconductive belt or other photoconductive surface(s). Moreover, the photoconductive surface(s) may transfer the toned image to an intermediate device such as an electrically conductive intermediate transport belt that subsequently carries the toned image to the sheet 22. As another example, a single photoconductive surface may be used to image each color plane in sequential processing steps, Also, while a single printhead 14 is illustrated, a separate printhead may alternatively be provided for each image forming station 20K, 20Y, 20M and 20C. Still further, other optical system configurations, including the use and/or location of different types of lenses and other optical devices may be utilized, depending upon the requirements of the particular apparatus.

Also, other suitable arrangements of sensors and optical devices may alternatively be implemented so as to detect the SOS and EOS of the laser beams. For example, two sensors may be used including a first sensor for SOS and a separate sensor for EOS. Additionally, each laser beam may process its own SOS and EOS signals. Still further, the SOS and EOS sensor(s) may be located in any suitable beam path locations, including areas outside of the printhead, e.g., adjacent to a corresponding photoconductive surface, etc.

Figure 4:
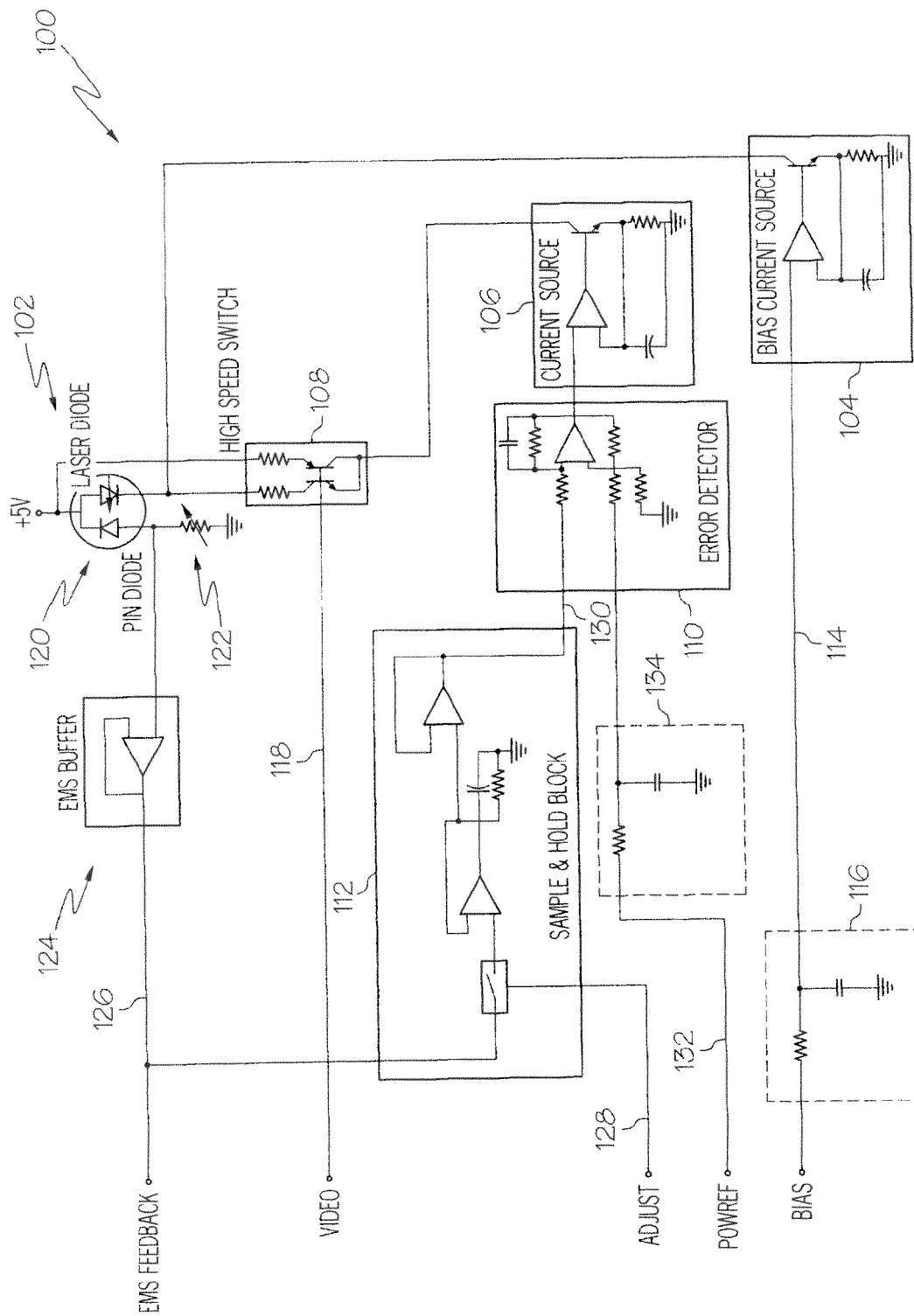
FIG. 4 is a schematic illustration of a laser driver for driving laser sources.

Referring to FIG. 4, a laser diode driver circuit 100 is illustrated. The laser diode driver circuit 100 may be included on the printhead circuitry 40, e.g., as part of each of the laser drivers 62K, 62Y, 62M, 62C The laser diode driver circuit 100 is coupled to the cathode of a laser diode 102, such as one of the laser sources 56k, 56Y, 56M, 56C. The anode of the laser diode is coupled to a suitable supply voltage V_cc, such as 5 Volts. The laser diode driver circuit 100 comprises a bias current source 104 labeled Bias_Current_Source, a laser drive current source 106 labeled Current_Source, a switch 108, a first compensation circuit 110 including an error detector, and a sample and hold circuit 112.

The output of the bias current source 104 couples to the cathode of the laser diode 102 such that the bias current source 104 applies a bias current to the laser diode 102 regardless of the value of corresponding laser modulation data. The bias current source 104 may be set to output a fixed current level or the bias current source 104 may be controlled or may be otherwise programmed by a bias current control signal, e.g., a signal, designated BIAS, which is carried on a Bias control line 114 to set the bias current level. The BIAS signal may comprise, for example, a pulse width modulation (PWM) output signal from the controller 12. Under this arrangement, the PWM BIAS signal may require filtering, e.g., by a first low pass filter 116 or other suitable circuitry.

The laser drive current source 106 is coupled to the cathode of the laser diode 102 via the switch 108. The switch 108 is controlled by a signal, designated VIDEO, which is carried on a switch control line 118. When the VIDEO signal is in a first state, the current from the laser drive current source 106 affects the drive current applied to the laser diode 102. When the VIDEO signal is in a second state, the current from the current source 106 is drawn through a resistive load of the switch 108 and negligibly contributes to the current applied to the laser diode 102.

The laser diode 102 is energized so as to emit laser light by modulating the VIDEO signal on control line 118 to the first state such that the laser drive current source 106 contributes along with the bias current source 104 to drive the laser diode 102. When the laser diode 102 emits laser light, the magnitude of the laser output power is measured by sensing the current leakage through a back-biased PIN Diode 120. In practice, the PIN diode 120 is typically packaged with the laser diode 102. The current sensed by the PIN diode 120 is converted to a voltage, designated V_Sense, e.g., by a resistance R_Sense 122. Thus, the voltage V_Sense is proportional to the current detected by the PIN diode 120. The resistance R_Sense 122 may be adjustable, such by using a digital or analog potentiometer or other form of programmable, adjustable or fixed resistance, e.g., to scale or otherwise vary the sensitivity of the PIN Diode 120. The V_Sense voltage may optionally be buffered by a feedback buffer 124 and the (buffered) voltage V_Sense is carried on a feedback signal line 126 to the controller 12 and to the sample and hold circuit 112.

The sample and hold circuit 112 receives as inputs, the V_Sense voltage and an ADJUST signal carried on an adjust line 128. When the ADJUST signal is in a first state, the sample and hold circuit samples the value of the V_Sense signal. When the ADJUST signal is in a second state, the first sample and hold circuit holds its previously sampled value of V_sense. The sample and hold circuit 112 outputs a sample and hold output signal P_0 on a sample and hold output line 130. The sampling of the laser power may be performed during the non-printing portion of each scan line, e.g., by setting the ADJUST and VIDEO signals to their respective active states.

The compensation circuit receives an input signal, designated POWREF, which is carried on a reference line 132. The POWREF signal corresponds to a desired laser power output level desired by the controller 12. The POWREF signal may comprise, for example, a pulse width modulation (PWM) output signal. Under this arrangement, the PWM POWREF signal may require filtering, e.g., by a second low pass filter 134 or other suitable circuitry. The compensation circuit 110 also receives as an input, the sample and hold output signal P_0. To set the laser power, the compensation circuit 110 controls the amount of current of the drive current source 106 until the measured laser output P_O corresponds to the desired laser power output POWREF. Thus, the laser driver 100 is controlled to selectively drive the laser source 102 to emit a laser beam such that power of the laser beam corresponds to a laser power control signal supplied to the laser driver.

Although discussed with reference to hardware, the laser power compensation can also be performed in software, or in a combination of hardware and software. Moreover, the control signals POWREF and BIAS may be controlled by software, e.g., a system central processor, video control application specific integrated circuit (ASIC) or other form of control. Moreover, the signals can be analog or digital, depending for example, upon the configuration of the corresponding apparatus.

As noted above, the POWREF signal is used by the laser diode driver circuit 100 to set the desired laser power output. According to various aspects of the present invention, the POWREF signal can also be used to set and/or adjust the threshold at which the synchronization signal, e.g., SOS and/or EOS, is detected by the synchronization sensor such that the corresponding synchronization system operates in a manner generally independent of laser power.

Figure 5:
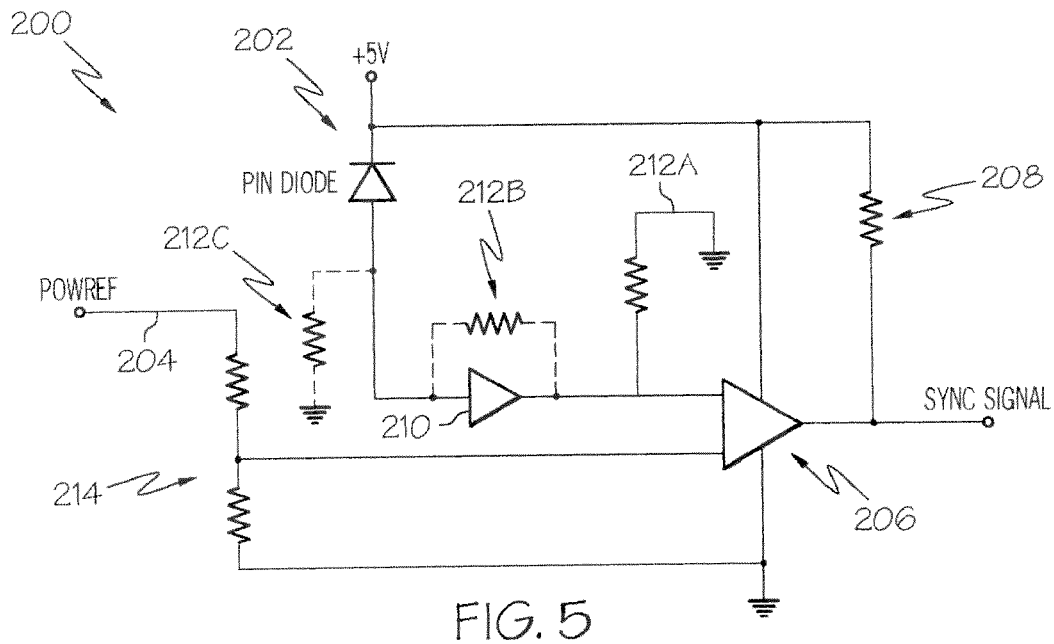
FIG. 5 is a schematic view of a synchronization system which may be utilized with the device of FIG. 1.

Referring to FIG. 5, a synchronization system 200 comprises a light detector 202, a control signal line 204 that carries a control signal and a comparing device 206. The light detector 202 has a light detecting element such as a PIN diode or other light sensitive device capable of outputting a detection signal that corresponds to a measure of light. For example, the light detector 202 may comprise one of the first or second detectors 82, 88, which are in the optical path of the laser beams from the printhead 14 as described in greater detail herein with reference to FIG. 3. By "optical path", it is meant that the laser beam either sweeps across the light element of the detector 202 or is sufficiently proximate to the light element that the beam can be detected.

The control signal line 204 carries a control signal that corresponds to a laser power control signal. For example, the control signal line 204 may carry the POWREF signal or a copy thereof. The control signal carried on the control signal line 204 may alternatively comprise a filtered, scaled or otherwise processed version of the POWREF (or other similar laser power control) signal. For example, if the POWREF signal is a digital signal, then the control signal carried on the control line 204 may be an analog representation of the digital POWREF signal, etc. For purposes of clarity of discussion herein, the control signal will be designated generally as POWREF.

The comparing device 206 is schematically illustrated as a comparator. The comparator typically comprises a (+) input, a (−) input and an output. The comparing device 206 may also have an open-collector output stage if a conventional comparator circuit chip is used. As such, a pull-up resistor 208 may be required to ensure that the comparator properly conveys the correct output state. The output of the comparing device 206 comprises a synchronization signal, e.g., the SOS or EOS signal described in greater detail above. The comparing device 206 may be implemented by alternate structures that are capable of comparing the detection signal with a power reference signal.

As noted above, the light detecting element comprises a device such as a PIN diode or other structure sensitive to light. For example, the PIN diode outputs the detection signal in the form of a current that is related to the intensity of light impinging thereon. Accordingly, the current output by the PIN diode may require filtering, buffering, processing and/or conversion, e.g., from a current to a voltage, such as by an amplifier 210. For example, the amplifier 210 may comprise a current amplifier that buffers, and/or adjusts the gain of the PIN diode current. If the comparing device 206 expects to see the detection signal as a voltage at a first input of the comparing device 206, then a pull-up resistor 212A may be required to convert the detection signal (current output) from the amplifier 210 to a corresponding voltage. As shown, the pull-up resistor 212A is tied between the output of the amplifier 210 and ground (0V). The pull-up resistor 212A may alternatively be tied between the amplifier output and Vcc, depending upon the desired characteristics and the manner in which POWREF is provided to the synchronization detector 200.

As another example, the amplifier 210 may comprise a transimpedance amplifier. The transimpedance amplifier converts the current from the PIN diode to a detection signal voltage. Thus, the pull-up resistor 212A is not required. However, a transimpedance gain setting resistor 212B may be required. As still another exemplary configuration, the current output of the PIN diode can be converted to a voltage using a gain setting resistor 212C tied to the anode of the PIN diode/amplifier input. Under this arrangement, the amplifier 210 may be configured as a voltage amplifier with appropriate gain setting resistors etc.

Depending upon the value and format of the power reference signal POWREF, an optional scaling circuit 214 may be provided to convert, scale or otherwise adjust the control signal POWREF carried on the control signal line 204 before the control signal is input to a second one of the inputs of the comparing device 206. As shown, the scaling circuit 214 comprises a simple voltage divider. However, in practice, the scaling circuit 214 may comprise a buffer, amplifier, voltage divider, etc. The scaling circuit 214 may also comprise a filter, e.g, to convert a digital PWM signal to an analog signal such as the filter 134 described with reference to FIG. 4, etc.

In an exemplary operation, assume that the higher the POWREF signal, the higher the laser diode output power. Also, assume that it is desired to provide an active low synchronization signal, the comparing device 206 comprises a voltage comparator and that the amplifier 210 comprises a current amplifier. Under this arrangement, the pull-up resistor 212A is provided between the output of the current amplifier 210 and ground (0V) to convert the current amplifier output to a voltage such that the stronger the light impinging upon the PIN diode of the light detector 202, the higher current amplifier output, hence the higher the detection signal voltage. The value of the pull-up resistor 212A is selected to provide a suitable gain to the current amplifier output. The detection signal is coupled to the (−) input of the comparing device 206 and the control signal (scaled, filtered, etc., POWREF signal) is coupled to the (+) input of the comparing device 206.

Assume that there is initially no light detected by the PIN diode. Further, assume that the impedance of the (−) input of the comparing device 206 is high relative to the selected value of the pull-up resistor 212A. Under this arrangement, the detection signal voltage seen at the (−) input of the comparing device 206 can be simplified generally to I_AmpOut×R_pull. That is, the voltage at the (−) input of the comparing device 206 is approximated as the product of the amplifier output times the resistance value of the pull-up resistor 212A. Since there is no (or very low) current output by the PIN diode of the light detecting element 202 when the laser beam is not impinging thereon, the voltage at the (−) input of the comparing device 206 will be low (closer to 0 volts).

The (+) input of the comparing device 206 is a control voltage corresponding to the (scaled, buffered, converted) power control signal POWREF. The control signal is typically somewhere between 0-Vcc volts, so initially, the voltage at the (+) input of the comparing device 206 should be greater than the detection signal voltage at the (−) input of the comparing device 206. Thus, the output of the comparing device 206 is pulled high by the comparator pull-up resistor 208, designating to the controller 12 that the sensor 200 is inactive, i.e., has not detected a beam.

As a corresponding laser beam from a laser source is swept across the PIN diode of the light detecting element 202, the PIN diode current output increases. Thus, the current amplifier output increases. Accordingly, the voltage at the (−) input of the comparing device 206 increases When the voltage at the (−) input exceeds the value of the power control signal applied to the (+) input of the comparing device 206, the comparator output will be pulled low, designating the detection of the laser beam.

As the laser beam sweeps past the PIN diode, the PIN diode output current will once again decrease. Thus, the voltage at the (−) input of the comparing device 206 will begin to decrease and once again fall below the value of the control signal at the (+) input of the comparing device 206, thus returning the comparator output to a high level. The comparing device 206 may comprise hysteresis or may be damped to prevent spurious bouncing of the comparator output as the light is swept across the PIN diode and the output of the comparator transitions from inactive to active, back to inactive.

Under this arrangement, the higher the laser power control signal, designating that the laser beam has a relatively high output power, the higher the required detected light by the PIN diode before the comparator output will designate an active state. Correspondingly, if the control signal is relatively lower, designating a relatively lower laser output power, then a relatively lower PIN diode output is required before the comparator output will designate an active state.

For active high logic, the detection signal can be coupled to the (+) input of the comparing device 206 and the POWREF signal can be coupled to the (−) input of the comparing device 206. The threshold for detecting the laser light by the comparing device 206 is set relative to the spot power of the corresponding laser beam because the comparing device 206 infers spot power of the beam that is sweeping across the PIN diode based upon the value of the control signal, which corresponds to the laser power control signal (POWREF) used to establish the spot power of the laser beam during calibration operations.

The ability to vary the threshold of the sensor based upon an implied measure of spot power means that the sensor will output its synchronization signal in a sufficiently consistent manner regardless of the spot power of the laser diode. Thus, color-plane registration shift in the scan position that may otherwise occur as a result of variations in laser power is avoided.

Figure 6:
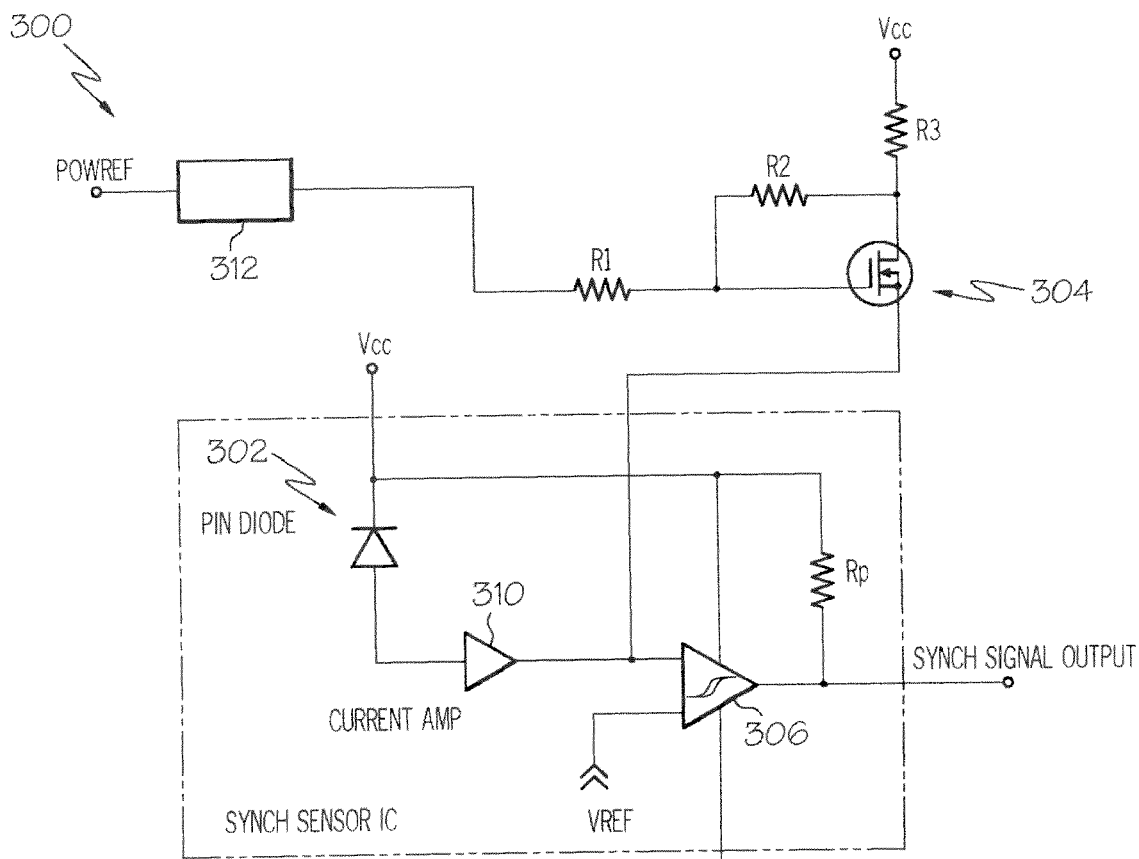
FIG. 6 is a schematic view of an alternative synchronization system which may be utilized with the device of FIG. 1.

An alternative configuration is shown in FIG. 6. A synchronization system 300 for an electrographic device comprises a light detector 302, a gain setting device 304 and a comparing device 306. In a manner analogous to that of FIG. 5, the light detector 302 may comprise one of the first or second detectors 82, 88, which are in the optical path of the laser beams from the printhead 14 as described in greater detail herein with reference to FIG. 3.

The comparing device 306 is schematically illustrated as a comparator, which conventionally comprises a (+) input, a (−) input and an output. The comparing device 306 may also have an open-collector output stage if a conventional comparator circuit chip is used. As such, a pull-up resistor Rp may be required to ensure that the comparator output properly conveys the correct output state. The output of the comparing device 306 comprises a synchronization signal, e.g., the SOS or EOS signal described in greater detail above. The comparing device 306 may be implemented by alternate structures that are capable of comparing the detection signal with a power reference signal.

The light detector 302 has a light detecting element such as a PIN diode or other light sensitive device capable of outputting a detection signal that corresponds to a measure of light in a manner analogous to that described with reference to FIG. 5. Accordingly, the current output by the PIN diode may require filtering, buffering, processing and/or conversion, e.g., from a current to a voltage, such as by an amplifier 310. For example, the amplifier 310 may comprise a current amplifier that buffers, and/or adjusts the gain of the PIN diode current.

The gain setting device 304 is coupled to the output of the amplifier 310 and the (+) input of the comparing device 306 to control the gain of the detection signal derived from the PIN diode output by converting the current output of the amplifier 310 to a corresponding voltage. The gain setting device 304 may comprise a suitably controllable variable resistance or any device or circuit capable of being controlled to adjust the gain of the detection signal. For example, the gain setting device 304 is schematically illustrated as a MOSFET configured as a variable resistance. However, other devices, such as digital potentiometers, JFETS, optical devices such as light dependent resistors, etc., may be used to vary the gain of the detection signal. As shown, Resistors R1, R2 and R3 bias the MOSFET in its triode (linear) region. R2 feeds back part of the drain voltage to the gate to reduce distortion. Under these conditions, the MOSFET operates like a resistance, controlled by the gate voltage.

The gate of the MOSFET is coupled to a control signal through R1 as shown. The control signal corresponds to a laser power control signal. For example, the control signal may comprise the POWREF signal or a copy thereof. The control signal may alternatively comprise a filtered, scaled or otherwise processed version of the POWREF (or other similar laser power control) signal. For example, if the POWREF signal is a digital signal, then the control signal may be an analog representation of the digital POWREF signal, etc. For example, the POWREF signal may comprise a pulse width modulated digital signal. Under this arrangement, a low pass filter 312 may be utilized to convert the digital POWREF signal to a corresponding analog value corresponding to POWREF. If the POWREF signal is a multi-bit digital value, then the filter 312 may further comprise a suitable digital to analog converter. The filter 312 may further/alternatively provide scaling, buffering and other suitable processing of the POWREF signal. For purposes of clarity of discussion herein, the control signal coupled to the gain setting device 304 will be designated generally as POWREF whether buffered/filtered etc., or not.

The gain of the gain setting device 304 is set to achieve a desired synchronization signal sensing so that a sufficiently consistent detection signal is generated generally regardless of the laser power of the laser beam that sweeps across the light detector 302.

In an exemplary operation, assume that the higher the POWREF signal, the higher the laser diode output power. Also, assume that it is desired to provide an active low synchronization signal, the comparing device 306 comprises a voltage comparator and the gain setting device 304 comprises a MOSFET. The detection signal is coupled to the (+) input of the comparing device 306 and a control reference signal is coupled to the (−) input of the comparing device 306. The control reference signal, designated in FIG. 6 as VREF, can be any suitable signal that provides a reference or threshold value to the comparing device 306. The reference signal VREF may be programmable or fixed. If the reference signal VREF is fixed, optional scaling, filtering, buffering, etc., of the reference signal may be provided.

Assume that there is initially no light detected by the PIN diode. Further, assume that the impedance of the (+) input of the comparing device 306 is high relative to the resistance of the gain setting device 304. Under this arrangement, the detection signal voltage seen at the (+) input of the comparing device 306 can be simplified generally to Vcc−I_AmpOut× R_gain. That is, the voltage at the (+) input of the comparing device 306 is approximated as the product of Vcc minus the amplifier output times the resistance value of the gain setting device 304. Since there is no (or very low) current output by the PIN diode of the light detecting element 302 when the laser beam is not impinging thereon, the voltage at the (+) input of the comparing device 306 will be relatively high (closer to Vcc volts).

Initially, the voltage at the (−) input of the comparing device 306 should be less than the detection signal voltage at the (+) input of the comparing device 306. Thus, the output of the comparing device 306 is pulled high by the comparator pull-up resistor Rp, designating to the controller 12 that the sensor 300 is inactive, i.e., has not detected a beam.

As a corresponding laser beam from a laser source is swept across the PIN diode of the light detecting element 302, the PIN diode current output increases. Thus, the current amplifier output increases. Accordingly, the voltage at the (+) input of the comparing device 306 decreases. When the voltage at the (+) input falls below the value of the power control signal applied to the (−) input of the comparing device 306, the comparator output will be pulled low, designating the detection of the laser beam.

As the laser beam sweeps past the PIN diode, the PIN diode output current will once again decrease. Thus, the voltage at the (+) input of the comparing device 306 will begin to increase and once again rise above the value of the control signal at the (−) input of the comparing device 306, thus returning the comparator output to a high level.

Under this arrangement, the higher the laser power control signal POWREF, designating that the laser beam has a relatively higher output power, the lower the value resistance of the gain setting device 304 (lower gain). Thus, relatively more detected light by the PIN diode is required before the comparator output will designate an active state. Correspondingly, if the POWREF control signal is relatively lower, designating a relatively lower laser output power, then the resistance of the gain setting device 304 is relatively high such that a relatively lower PIN diode output is required before the comparator output will designate an active state.

For active high logic, the detection signal can be coupled to the (+) and (−) inputs of the comparing device 306 may be swapped in a manner analogous to that described with reference to FIG. 5.

The system described with reference to FIG. 6 can be adapted to circuits provided as an integrated circuit where the sensitivity is controlled using an external gain resistance by adapting the gain setting device 304 to the particular requirements of the synchronization circuit. The programmable gain setting device 304 may comprise for example, a MOSFET, FET bipolar junction or other transistor or semiconductor device, a digital programmable potentiometer, vactrol or other light dependent resistive device, or other device whose characteristics may be controlled to vary the gain of the light detector.

Figure 7:
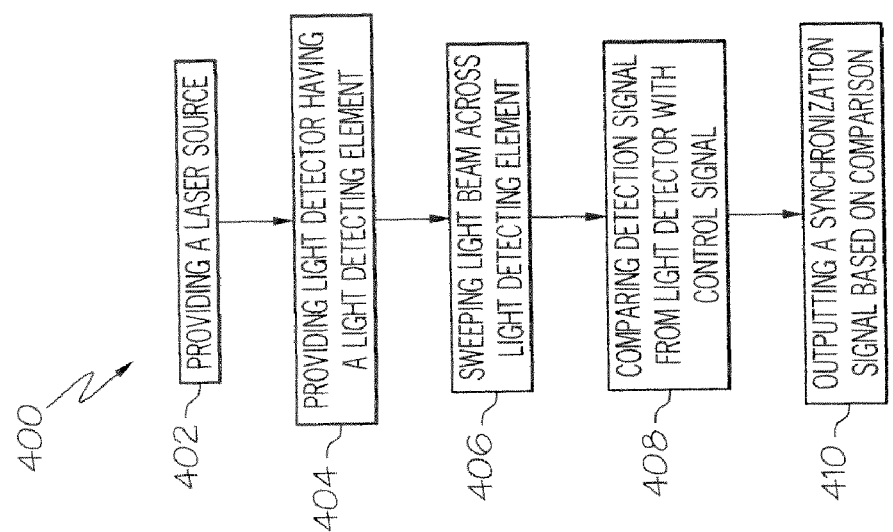
FIG. 7 is a flow chart illustrating a method of detecting a synchronization signal.

Referring to FIG. 7, a method 400 of generating a synchronization signal in an electrographic device is illustrated. A laser source operable to emit a laser beam having an intensity that corresponds to a laser power control signal is provided at 402. A light detector having a light detecting element is provided at 404, where the light detector generates a detection signal based upon detected light intensity. The laser beam is swept across the light detecting element at 406. The detection signal is compared at 408 with a control signal that corresponds to the laser power control signal, e.g., POWREF as described in greater detail herein, and a synchronization signal is output at 410 based upon the comparison.

Figure 8:
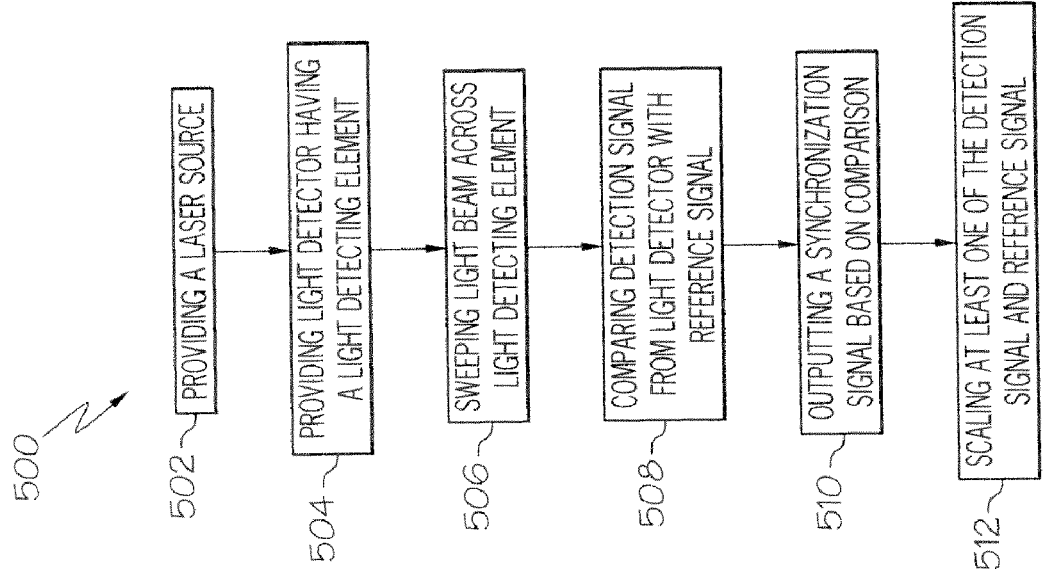
FIG. 8 is a flow chart illustrating another method of detecting a synchronization signal.

Referring to FIG. 8, a method 500 of generating a synchronization signal in an electrographic device is illustrated. A laser source operable to emit a laser beam having an intensity that corresponds to a laser power control signal is provided at 502. A light detector having a light detecting element is provided at 504, where the light detector is provided for generating a detection signal based upon detected light intensity. The laser beam is swept across the light detecting element at 506. The detection signal is compared with a reference signal at 508 and a synchronization signal is output at 510 based upon the comparison, where at least one of the detection signal and the reference signal is scaled at 512 based upon a control signal that corresponds to the laser power control signal.

As will be appreciated by one of skill in the art, the various aspects of the present invention may be embodied as a method, system, or computer program product. Moreover, the various aspects of the present invention may take the form of an entirely hardware embodiment or an embodiment combining software and hardware aspects.

The present invention is described below with reference to schematics, flowchart illustrations and/or block diagrams of methods and apparatus systems according to embodiments of the invention. It will be understood that each block of the flowchart illustrations and or block diagrams, and combinations of blocks in the flowchart illustrations and or block diagrams may also be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. For example, the various aspects of the present invention may be implemented in a copier, facsimile machine, multi-function machine, or other suitable structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having thus described the invention of the present application in detail and by reference to preferred embodiments thereof, it will be apparent that modifications and variations are possible without departing from the scope of the invention defined in the appended claims.

What is claimed is:

1. A synchronization system for an electrographic device comprising:
    a laser source operable to emit a laser beam;
    a laser driver coupled to said laser source, said laser driver controlled to selectively drive said laser source to emit said laser beam such that an intensity of said laser beam corresponds to a laser power control signal supplied to said laser driver;
    a light detector having a light detecting element in an optical path of said laser beam such that said that said light detector generates a detection signal based upon the intensity of light measured thereby; and
    a comparing device that outputs a synchronization signal based upon a comparison of said detection signal with a control signal that corresponds to said laser power control signal.

2. The system according to claim 1, wherein a current output by said light detecting element is converted to a voltage before comparison with said laser power control signal by said comparing device.

3. The system according to claim 1, wherein a current output of said light detecting element is amplified by an amplifier before being input to said comparing device.

4. The system according to claim 1, further comprising a scaling circuit to scale said control signal before said control signal is input to said comparing device.

5. A synchronization system for an electrographic device comprising:
    a laser source operable to emit a laser beam;
    a laser driver coupled to said laser source, said laser driver controlled to selectively drive said laser source to emit said laser beam such that an intensity of said laser beam corresponds to a laser power control signal supplied to said laser driver;
    a light detector having a light detecting element in an optical path of said laser beam such that said that said light detector generates a detection signal based upon the intensity of light measured thereby;

a comparing device that outputs a synchronization signal based upon a comparison of said detection signal with a reference signal; and a gain setting device that scales at least one of said detection signal and said reference signal based upon a control signal that corresponds to said laser power control signal.

6. The system according to claim 5, wherein said light detecting element comprises a PIN diode that outputs a current related to the intensity of light measured thereby.

7. The system according to claim 6, wherein said current output of said PIN diode is amplified by a current amplifier and said gain setting device scales a gain of said current amplifier.

8. The system according to claim 5, wherein said gain setting device comprises a variable resistance that scales the gain of said detection signal.

9. The system according to claim 5, further comprising a scaling circuit to scale said control signal for controlling said gain setting device.

10. The system of claim 5, wherein said light detector comprises an amplifier having an input coupled to said light detecting element and an output coupled to said comparing device.

11. The system of claim 10, wherein said gain setting device is coupled to said amplifier for setting an amount of gain for said output of said amplifier relative to said input thereof 12. The system of claim 11, wherein said gain setting device comprises a transistor having a control terminal coupled to said laser power control signal, wherein said transistor is coupled between said output of said amplifier and a supply voltage.

13. A method of generating a synchronization signal in an electrographic device comprising:

providing a laser source operable to emit a laser beam having an intensity that corresponds to a laser power control signal;

providing a light detector having a light detecting element, said light detector for generating a detection signal based upon detected light intensity;

sweeping said laser beam across said light detecting element;

comparing said detection signal with a reference signal;

outputting a synchronization signal based upon said comparison; and scaling at least one of said detection signal and said reference signal based upon a control signal that corresponds to said laser power control signal.

14. The method according to claim 13, wherein said providing a light detector having a light detecting element comprises providing a PIN diode that outputs a current related to the intensity of light measured thereby.

15. The method according to claim 14, further comprising amplifying said current output of said PIN diode by a current amplifier, wherein said scaling at least one of said detection signal and said reference signal based upon a control signal that corresponds to said laser power control signal comprises scaling a gain of said current amplifier.

16. The method according to claim 13, wherein said scaling at least one of said detection signal and said reference signal based upon a control signal that corresponds to said laser power control signal comprises controlling a variable resistance to change a gain of said detection signal.

17. The method according to claim 13, further comprising scaling said control signal.

18. A synchronization system for a laser based device comprising:

a laser source for emitting a laser beam;

a laser driver coupled to said laser source, said laser driver controlled to selectively drive said laser source to emit said laser beam such that an intensity of said laser beam corresponds to a laser power control signal supplied to said laser driver;

a light detector having a light detecting element in an optical path of said laser beam such that said that said light detecting element generates a detection signal based upon the intensity of light incident thereto, said light detector generating an output signal based upon said detection signal; and a signal generator for generating a synchronization signal, said signal generator having a first input receiving said output signal of said light detector and a second input receiving said laser power control signal such that said synchronization signal is based upon said output signal of said light detector and said laser power control signal.

19. The system of claim 18, wherein said signal generator comprises:

a gain setting device associated with said light detector for setting a scaling amount for said output signal of said light detector relative to said detection signal; and a comparing device that outputs said synchronization signal based upon a comparison of a said output signal of said light detector with a reference signal.

20. The system of claim 19, wherein said light detector comprises an amplifier circuit coupled to said light detecting element, an output of said amplifier circuit being said output signal of said light detector.

21. The system of claim 20, wherein said gain setting device provides a variable resistance to said amplifier circuit for controlling said scaling amount.

22. The system of claim 20, wherein said gain setting device comprises a transistor element having a control terminal coupled to said laser power control signal.

23. The system of claim 22, wherein said transistor element is coupled between said output of said amplifier circuit and a supply voltage.

24. The system of claim 18, wherein said signal generator comprises a comparing device for comparing said output signal of said light detector and said laser power control signal.

25. The system of claim 24, wherein said comparing device compares said output signal of said light detector and a signal corresponding to said laser power control signal.

* * * * *